(12) United States Patent
Kamenetskaya et al.

(10) Patent No.: US 9,646,359 B2
(45) Date of Patent: May 9, 2017

(54) INDEFINITE TEXTURE FILTER SIZE FOR GRAPHICS PROCESSING

(71) Applicant: QUALCOMM Incorporated, San Diego, CA (US)

(72) Inventors: Elina Kamenetskaya, Brookline, MA (US); Javier Ignacio Girado, San Diego, CA (US); Liang Li, San Diego, CA (US); Jay Chunsup Yun, Carlsbad, CA (US); Vineet Goel, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 14/616,404

(22) Filed: Feb. 6, 2015

(65) Prior Publication Data

US 2016/0180548 A1    Jun. 23, 2016

Related U.S. Application Data

(60) Provisional application No. 62/096,115, filed on Dec. 23, 2014.

(51) Int. Cl.
*G06T 1/60* (2006.01)
*G06T 1/20* (2006.01)
*G06T 15/00* (2011.01)

(52) U.S. Cl.
CPC .................. *G06T 1/60* (2013.01); *G06T 1/20* (2013.01); *G06T 15/00* (2013.01)

(58) Field of Classification Search
CPC ......... G06T 11/001; G06T 15/04; G06T 7/40; G06T 7/403; G06T 2207/20024
See application file for complete search history.

(56) References Cited

U.S. PATENT DOCUMENTS

| 6,762,763 B1 | 7/2004 | Migdal et al. |
| 8,643,659 B1 | 2/2014 | Baldwin |
| 2003/0151608 A1 | 8/2003 | Chung et al. |

(Continued)

FOREIGN PATENT DOCUMENTS

JP    2001076176 A    3/2001

OTHER PUBLICATIONS

Bjorke "GPU Gems—Chapter 24. High-Quality Filtering," Sep. 2007, XP055217059, Retrieved from the Internet: URL:https://developer.nvidia.com/gpugems/G PUGems/gpugems_ch24.html, 30 pp.

(Continued)

*Primary Examiner* — Antonio A Caschera
(74) *Attorney, Agent, or Firm* — Shumaker & Sieffert, P.A.

(57) ABSTRACT

An example method of filtering in a graphics processing unit (GPU) may include storing, by a texture engine of the GPU, filter coefficients of a filter as a texture memory object (TMO) in a texture cache of the GPU in response to a first instruction. The method may include retrieving, by the texture engine, filter coefficients from the texture cache in response to a second instruction. The method may include storing, by the texture engine, pixel data in the texture cache of the GPU in response to the second instruction. The pixel data may include one or more pixel values. The method may include filtering, by the texture engine, the pixel data stored in the texture cache using the retrieved filter coefficients.

30 Claims, 4 Drawing Sheets

(56) References Cited

U.S. PATENT DOCUMENTS

2011/0221743 A1    9/2011  Keall et al.
2015/0187089 A1*   7/2015  Neyman ............... G06T 11/40
                                                    345/582

OTHER PUBLICATIONS

Fialka, et al., "FFT and Convolution Performance in Image Filtering on GPU," Information Visualization, 2006 London, England 05-07; Jul. 2006, Piscataway, NJ, USA,IEEE, Jul. 5, 2006, pp. 609-614, XP010926971, DOI: 10.1109/IV.2006.53 ISBN: 978-0-7695-2602-7.

Forrest, et al., "Communication-minimizing 2D convolution in GPU Registers," 2013 IEEE International Conference on Image Processing, IEEE, Sep. 15, 2013, pp. 2116-2120, XP032565864, DOI: 10.1109/ICIP.2013.6738436, 5 pp.

Fung, et al., "Open VIDIA: Parallel GPU Computer Vision", ACM Multimedia, 2004: Proceedings of the 12th Acm International Conference on Multimedia, Oct. 10-16, 2004, New York, NY, USA, Assoc. for Computing Machinery, New York, NY, USA, Jan. 2005, XP008096985, DOI: 10.1145/1101149.1101334 ISBN: 978-1-58113-893-1, pp. 849-852.

International Search Report and Written Opinion from International Application No. PCT/US2015/065575, dated May 3, 2016, 14 pp.

Silpa, et al., "Texture Filter Memory—a Power-efficient and Scalable Texture Memory Architecture for Mobile Graphics Processors," Computer-Aided Design, 2008. ICCAD 2008. IEEE/ACM International Conference on, IEEE, Piscataway, NJ, USA, Nov. 10, 2008, pp. 559-564, XP031398698, ISBN: 978-1-4244-2819-9.

Zhang, et al., "Image Parallel Processing based on GPU," Advanced Computer Control (ICACC), 2010 2nd International Conference on, IEEE, Piscataway, NJ, USA, Mar. 27, 2010, pp. 367-370, XP031690951, ISBN: 978-1-4244-5845-5.

Gee, Kevin, "Introduction to the Direct3D 11 Graphics Pipeline", XNA Developer Connection, Microsoft Corporation, Nvision 08, Aug. 25 through 27, 2008, 55 pp.

Daly et al. "X3D: Extensible 3d Graphics Standard" IEE Signal Processing Magazine. Issue 130, Nov. 2007, 6 pp.

Pixar, "The RenderMan Interface" Version 3.2.1, Nov. 2005, 226 pp.

Second Written Opinion for International Application No. PCT/US2015/065575, mailed Dec. 6, 2016, 8 pp.

* cited by examiner

INDEFINITE TEXTURE FILTER SIZE FOR GRAPHICS PROCESSING

This application claims priority to U.S. Provisional Patent Application No. 62/096,115, filed Dec. 23, 2014, the entirety of which is incorporated by reference herein.

TECHNICAL FIELD

This disclosure relates to techniques for graphics processing, and more specifically to techniques for filtering textures.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. Converting information about 3D objects into a bit map that can be displayed is known as pixel rendering, and requires considerable memory and processing power. In the past, 3D graphics capability was available only on powerful workstations. However, now 3D graphics accelerators are commonly found in personal computers (PC), as well as in embedded devices, such as smart phones, tablet computers, portable media players, portable video gaming consoles, and the like. Typically, embedded device have less computational power and memory capacity as compared to conventional PCs. As such, increased complexity in 3D graphics rendering techniques presents difficulties when implementing such techniques on an embedded system. Other tasks performed by GPUs include filtering tasks for image processing.

SUMMARY

This disclosure describes techniques for performing filtering in a graphics processing unit (GPU). In examples of the disclosure, a GPU may be configured to store and fetch filter coefficients (also called filter weights) to and from a texture memory using a modified texture engine of the GPU. The modified texture engine may be configured to fetch the filter coefficients from the memory and to store the filter coefficients into a cache. In this way, filter coefficients for a filter of an indefinite size may be stored in the texture memory for use in various filtering operations that may be performed on the GPU. In one example, the texture engine itself may be configured to perform filtering operations on pixels or texels using the filter coefficients stored in the texture memory. In other examples, other hardware units of a GPU may be configured to fetch the filter weights from texture memory and perform a filtering operation.

In one example of the disclosure, a method for storing filter coefficients in a GPU comprises storing, by a texture engine of the GPU, filter coefficients of a filter as a texture memory object (TMO) in a texture memory accessible to the texture engine in response to a first instruction, wherein the texture memory is configured to store pixels and filter coefficients. The method further comprises retrieving, by the texture engine, filter coefficients from the texture memory in response to a second instruction, storing, by the texture engine, pixels from the texture memory in a texture cache of the texture engine in response to the second instruction, and filtering, by the texture engine, the pixels using the retrieved filter coefficients.

In another example of the disclosure, a device comprises a graphics processing unit (GPU), the GPU comprising: a texture engine, a texture memory configured to store pixels and filter coefficients, wherein the texture memory is accessible to the texture engine, and wherein the texture engine further comprises a texture cache, and at least one processor. The at least one processor is configured to: store, with the texture engine, filter coefficients of a filter as a texture memory object (TMO) in the texture memory in response to a first instruction, retrieve, with the texture engine, filter coefficients from the texture memory in response to a second instruction, store, with the texture engine, pixels from the texture memory in the texture cache of the texture engine in response to the second instruction, and filter, with the texture engine, the pixels using the retrieved filter coefficients.

In another example of this disclosure, a device comprises: means for storing, by a texture engine, filter coefficients of a filter as a texture memory object (TMO) in a texture memory accessible to the texture engine in response to a first instruction, wherein the texture memory is configured to store pixels and filter coefficients, means for retrieving, by the texture engine, filter coefficients from the texture memory in response to a second instruction, means for storing, by the texture engine, pixels from the texture memory in a means for caching in response to the second instruction, and means for filtering, by the texture engine, the pixels using the retrieved filter.

In another example of this disclosure, a non-transitory computer-readable storage medium that includes instructions stored thereon that, when executed, cause at least one processor to: store, by a texture engine of a GPU, filter coefficients as a texture memory object (TMO) in a texture memory accessible to the texture engine in response to a first instruction, wherein the texture memory is configured to store pixels and filter coefficients, retrieve, by the texture engine, the filter coefficients from the texture memory in response to a second instruction, store, by the texture engine, pixels from the texture memory in a texture cache of the texture engine in response to the second instruction, and filter, by the texture engine, the pixels using the retrieved filter coefficients.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
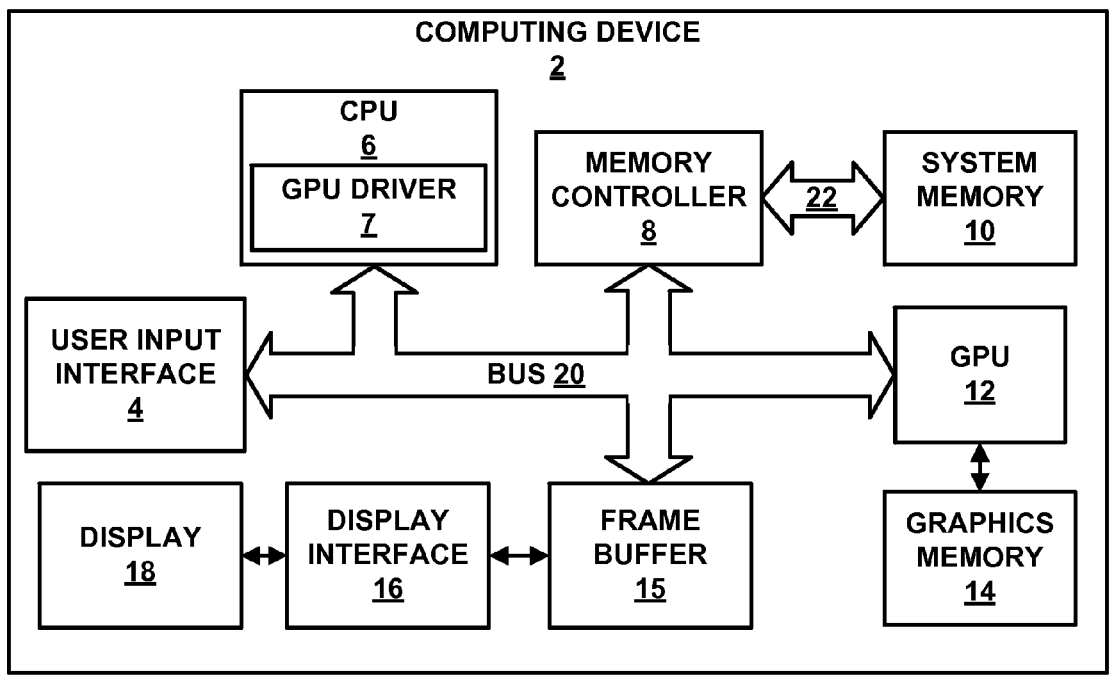
FIG. 1 is a block diagram showing an example computing device configured to use the techniques of this disclosure.

The demand for high quality and high resolution digital images continues to increase. Since high quality and high resolution digital images typically have large data sizes, hardware efficiency for performing image processing tasks becomes more important. One such image processing task is image filtering.

GPUs may render three-dimensional scenes made of polygons and/or process two-dimensional arrays of pixels. A GPU may apply and render one or more textures to each of the polygons. As part of rendering the scene, the GPU may be configured to filter the textures before converting a three-dimensional representation of the scene to a two-dimensional grid of pixels, a process referred to as rasterization. GPUs may also be configured to filter two-dimensional image data, e.g. arrays of pixels.

During the process of image filtering, a GPU may be configured to adjust an image based on one or more filter coefficients (also called filter weights). More particularly, the processing unit may apply a filter mask to pixel values to adjust the pixels. The filter mask comprises a 2D matrix of filter weights, and the processing unit applies each filter weight in the filter mask to a corresponding pixel. Typically, filter masks are square in shape, but may take any size or shape. The size of a filter mask is called a kernel size.

For many filters, the processing unit multiplies each filter weight by the corresponding pixel color value. The processing unit then adds the result of each of these multiplications together as the filtered value for the current pixel. In some examples, the filtered value may be divided and/or have a bias value added to it. Different types of filtering may be achieved by varying the values of the filter weights in the filter mask. Example types of filtering include sharpening, interpolation, edge finding, blurring, and embossing, as some non-limiting examples.

Filtering is often performed using a pointer to an image or group of pixels stored in a memory and a fixed filter stored in dedicated local register space. The fixed filter has a fixed number of filter coefficients, and the largest size of the fixed filter is limited by the size of the available dedicated local register space. If more filter sizes are desired, more dedicated register space would need to be designed into the GPU. As another drawback, switching from one filter to another may require a reload of the entire register space to load new filter coefficients. Some approaches for limiting the amount of hardware needed to store filter coefficients leverage particular features typical of filters (e.g., separability and symmetry) so that less than the total number of filter coefficients need to be stored. However, in general, conventional techniques for storing filter coefficients, particularly filter coefficients for a plurality of large kernel sizes, are inflexible and expensive in terms of hardware cost.

This disclosure proposes techniques for storing filter coefficients for a filter of indefinite size using a GPU. A GPU configured in accordance with the techniques of this disclosure stores filter coefficients in a texture memory of a texture engine of the GPU. The advantages of storing filter coefficients in texture memory include increased filter kernel size, as well as increased flexibility in terms of the binary representations and precisions that may be used to represent the filter coefficients, as will be discussed in greater detail below.

FIG. 1 is a block diagram illustrating an example computing device 2 that may be used to implement the techniques of this disclosure for storing filter coefficients in a graphics processing unit (GPU). Computing device 2 may comprise, for example, a personal computer, a desktop computer, a laptop computer, a tablet computer, a computer workstation, a video game platform or console, a mobile telephone such as, e.g., a cellular or satellite telephone, a landline telephone, an Internet telephone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include user input interface 4, central processing unit (CPU) 6, memory controller 8, system memory 10, GPU 12, graphics memory 14, display interface 16, display 18 and buses 20 and 22. Note that in some examples, graphics memory 14 may be "on-chip" with GPU 12. In some cases, CPU 6, memory controller 8, GPU 12, and graphics memory 14, and possibly display interface 16 shown in FIG. 1 may be on-chip, for example, in a system on a chip (SoC) design. User input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely-exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute GPU driver 7 for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

In other examples, the software instructions that execute on CPU 6 may cause GPU 12 to execute a general purpose shader for performing more general computations applicable to be executed by the highly parallel nature of GPU hardware. Such general-purpose applications may be a so-called general-purpose graphics processing unit (GPGPU) and may conform to a general-purpose API, such as OpenCL Memory controller 8 facilitates the transfer of data going into and out of system memory 10. For example, memory controller 8 may receive memory read and write commands, and service such commands with respect to system memory 10 in order to provide memory services for the components in computing device 2. Memory controller 8 is communicatively coupled to system memory 10 via memory bits 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer 15. Frame buffer 15 may be an independent memory or may be allocated within system memory 10. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computing device 2 via a wired or wireless communications link. For instance, display 18 may be a computer monitor or flat panel display connected to a personal computer via a cable or wireless link.

According to one example of the disclosure, and as will be explained in more detail below, GPU 12 may be configured to store, with a texture engine of GPU 12, filter coefficients as a texture memory object (TMO) in a texture memory accessible to the texture engine in response to a first instruction. For example, GPU 12 may be configured to store the filter coefficients in system memory 10 or graphics memory 14 in response to the first instruction. The texture memory may be configured to store pixels and filter coefficients. GPU 12 may be further configured to retrieve, with the texture engine, the filter coefficients from the texture memory in response to a second instruction, store, with the texture engine, the pixels from the texture memory in a texture cache of the texture engine in response to the second instruction, and filter the pixels using the retrieved filter coefficients.

Figure 2:
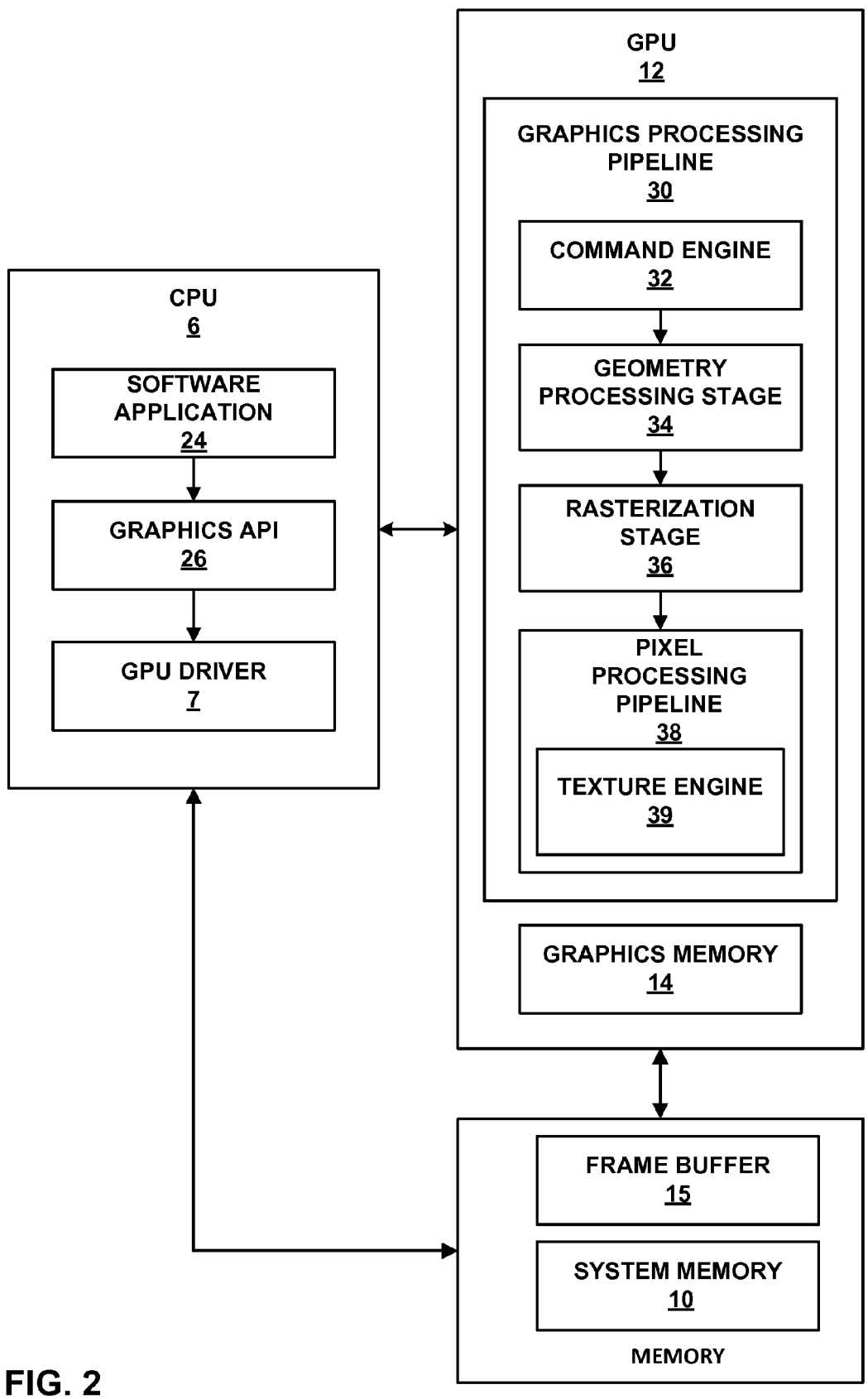
FIG. 2 is a block diagram showing components of FIG. 1 in more detail

FIG. 2 is a block diagram illustrating example implementations of CPU 6, GPU 12, and system memory 10 of FIG. 1 in further detail. CPU 6 may include at least one software application 24, graphics API 26, and GPU driver 7, each of which may be one or more software applications or services that execute on CPU 6. GPU 12 may include graphics processing pipeline 30 that includes a plurality of graphics processing stages that operate together to execute graphics processing commands. GPU 12 may be configured to execute graphics processing pipeline 30 in a variety of rendering modes, including a binning rendering mode and a direct rendering mode. As shown in FIG. 2, graphics processing pipeline 30 may include command engine 32, geometry processing stage 34, rasterization stage 36, and pixel processing pipeline 38. Pixel processing pipeline 38 may include texture engine 39. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10 and frame buffer 15. Frame buffer 15 may be a part of system memory 10 or may be separate from system memory 10. Frame buffer 15 may store rendered image data.

Software application 24 may be any application that utilizes the functionality of GPU 12. For example, software application 24 may be a GUI application, an operating system, a portable mapping application, a computer-aided design program for engineering or artistic applications, a video game application, or another type of software application that may utilize a GPU.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates.

The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 15 associated with a display device. Graphics pipeline 30 may be configured to execute in one of a plurality of different rendering modes, including a binning rendering mode and a direct rendering mode.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

Graphics processing pipeline 30 may be configured to receive one or more graphics processing commands from CPU 6, via graphics driver 7, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Again, graphics pipeline 30 may be configured to execute in one of a plurality of different rendering modes, including a binning rendering mode and a direct rendering mode.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations. In various examples geometry processing stage 34 may perform filtering.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership test, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Texture engine 39 may included as part of pixel processing pipeline 38. Texture engine 39 may include both programmable and fixed function hardware designed to apply textures (texels) to pixels. Texture engine 39 may include dedicated hardware for performing texture filtering, whereby one or more texel or pixel values are multiplied by one or more filter coefficient values. Texture engine 39 may store filtering results in an accumulator, and add the filtering results to produce a final filtered texel or pixel. As will be explained in more detail below, this disclosure proposes modifications to texture engine 39 so that a texture memory and/or a texture cache of texture engine 39 may be used to store filter coefficients. It should be noted that the techniques of this disclosure are not limited to texture filtering. Any part of graphics pipeline may perform the filtering techniques of this disclosure of storing filter coefficients in texture memory.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Although frame buffer 15 and system memory 10 are illustrated as being separate memory units, in other examples, frame buffer 15 may be part of system memory 10.

In an example in accordance with the techniques of this disclosure, GPU 12 may be configured to store, with texture engine 39, filter coefficients of a filter as a texture memory object (TMO) in a texture memory (e.g., graphics memory 14 or system memory 10) accessible to texture engine 39 in response to a first instruction, wherein the texture memory is configured to store pixels and filter coefficients. GPU 12 may be further configured to retrieve, with texture engine 39, filter coefficients from the texture memory in response to a second instruction, and store, with texture engine 39, pixels from the texture memory in a texture cache of the texture engine in response to the second instruction, and filter, with texture engine 39, the pixels using the retrieved filter coefficients.

Figure 3:
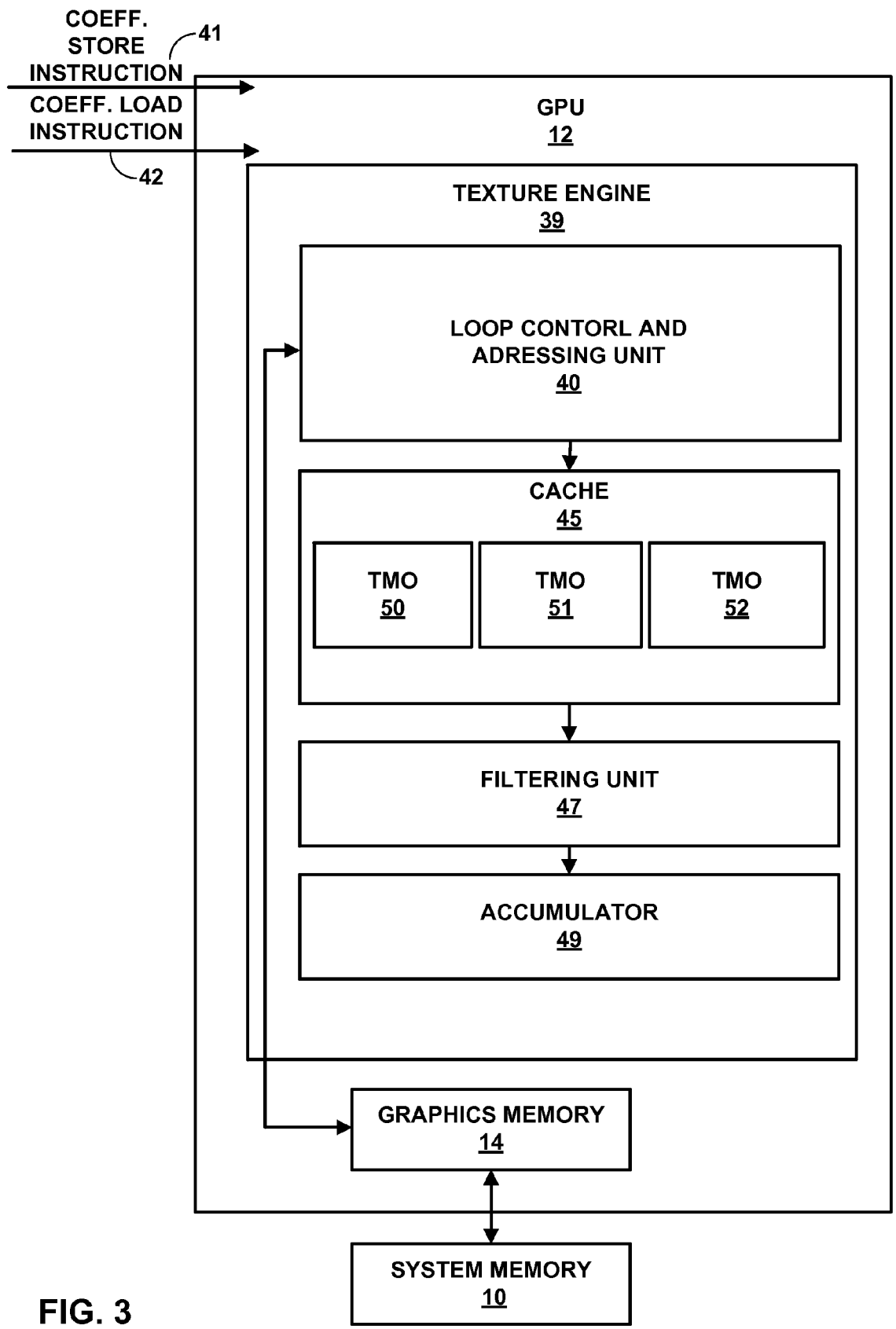
FIG. 3 is a block diagram showing an example texture engine configured to implement the techniques of this disclosure.

FIG. 3 is a block diagram showing an example of GPU 12 and texture engine 39 that have been configured to store filter coefficients according to the techniques of this disclosure. As shown in FIG. 3, texture engine 39 may include loop control and addressing unit 40, a cache 45, filtering unit 47, accumulator 49, and texture memory objects (TMQs) 50, 51, and 52 which are stored in cache 45.

The following describes filter coefficient storage techniques of the current disclosure, implemented by GPU 12 of FIG. 3. In one example, this disclosure proposes storing filter coefficients in a texture memory in response to a filter coefficient store instruction.

As described above, previous image filtering hardware required every filter coefficient to be stored in dedicated local register space (e.g., filter registers). Previous GPU s included a limited number (e.g., 4 or 9) of these dedicated filter registers. The small number of filter registers limited the number of filter coefficients (i.e. the kernel size) that a GPU could apply to a texture during a single pass through the GPU pipeline. To apply filters having kernel sizes greater than the number of registers, a program executing would have to configure the GPU to swap filter coefficients in and out of the dedicated filter registers from memory. Configuring the GPU to swap filter coefficients may require time-consuming and difficult GPU programming.

If a program executing on the GPU the kernel size is larger than the number of filter registers, as may be the case when performing trilinear filtering as one example, the GPU may have to perform an additional pass through the graphics rendering pipeline to load all the filter coefficients into the dedicated filter registers and multiply each of the filter coefficients with corresponding texels.

The dedicated filter registers of previous GPUs were also inflexible in that each filter register may allow only one binary representation and could only use a particular number of bits (e.g., 8, 16, or 32 bits) to represent each filter coefficient. Thus, programmers of GPUs could not convert between different binary representations, and could not easily switch between precisions of filter coefficients.

The techniques of this disclosure allow a GPU, such as GPU 12, to store a potentially unlimited number of filter coefficients in a texture memory, bounded only by available texture memory, e.g. graphics memory 14. Texture engine 39 may store filter coefficients in graphics memory 14 and cache 45, both of which are configured to store texture data, pixel data, and filter coefficients. For hardware GPU applications, the storage of texture data can be accomplished using a TMO (texture memory object). A TMO is typically used to define fields associated with textures used in graphics applications.

GPUs contain native support to cache texels from textures, e.g. using cache 45. The techniques of this disclosure propose treating filter weights in a similar manner to texels, i.e. using TMOs to store filter coefficients. Some examples in accordance with the techniques of this disclosure allow a standard TMO to be used in defining a weight texture and allows pre-existing hardware (used to manage texel fetching and caching), to also manage fetching and caching of weights. In addition to avoiding dedicated storage elements (e.g., filter registers, this approach also allows for multiple filter operations (using filters with different weights) to be loaded and in flight at the same time.

Some previous filtering hardware used shader processing elements (SPEs) of a shader, such as a geometry shader, to perform filtering. The SPEs included single instruction multiple data (SIMD) floating point, but lacked integer units. Thus, using SPEs to perform texture filtering did not allow filtering when using integer filter coefficients. This disclosure describes, in some examples, that GPU 12 may use processing units of texture engine 39 to perform filtering. Texture engine 39 may include processing elements capable of processing filter coefficients in a variety of different binary number representations. For example, texture engine 39 may be configured to perform filtering with integer filter coefficients or floating point coefficients. Additionally, texture engine 39 may include texture conversion hardware, which enables texture engine 39 to convert pixels or texels from a first binary representation to a second, different binary representation, as described in greater detail below.

Texture engine 39 may load the filter coefficients from graphics memory 14 and into cache 45. Texture engine 39 may store the filter coefficients as TMOs. A TMO is a descriptor that is included as part of a graphics API, such as OpenGL, DirectX, etc., which may describe properties about a texture. API-specific examples of a TMO include DirectX11 and OpenGL texture objects. A TMO may include a pointer to an address of a texture within a memory, such as system memory 10 or graphics memory 14. The TMO may also include fields related to information about the texture, such as a texture size, and a texture format. The texture format may indicate a binary representation used for the texels of the texture.

This disclosure extends the concept of a TMO to refer to and describe filter coefficients. The TMO may include a size, which may be the size of the filter kernel, as well as a filter coefficient format, which may indicate a binary representation of each of the filter coefficients. Examples of binary representations for filter coefficients may include: floating point representations, such as 16-bit, 32-bit, and 64-bit floating point representations, integer representations, such as signed and unsigned integer representations of different precisions, as well as unsigned normalized representations.

Cache 45 may be configured to store texture data, pixel data and/or filter coefficient data as TMOs, e.g. TMOs 50, 51, and 52, TMOs 50, 51, and 52 may include any combination of filter coefficients, pixel data, or texels. In some examples, TMOs 50 and 51 may be different filter coefficients of two different filter kernels. Also, the filter coefficients of TMOs 50 and 51 may be of different sizes. Texture engine 39 may determine the format of the filter kernels based on size fields of TMOs 50 and 51. The sizes of TMOs 50 and 51 are flexible and may be defined in any manner. Texture engine 39 may then load filter coefficients from cache 45 into filtering unit 47. Filtering unit 47 may be configured to multiply the texels or pixels by the loaded filter coefficients and store the product of the multiplication in accumulator 49. Texture engine 39 may iteratively repeat the process of multiplying filter coefficients with texels until GPU 12 has processed all the filter coefficients and/or texels specified by a GPU kernel. Texture engine 39 may generally be configured to transform a flat texture onto the correct angle and perspective for a three-dimensional space. Texture engine 39 may also be configured to filter texels and/or pixels.

In examples of the disclosure that will be described in more detail below, GPU 12 may be configured to store, with texture engine 39 of GPU 12, filter coefficients of a filter as a texture memory object (TMO) in a texture memory (e.g., graphics memory 14 or system memory 10) accessible to texture engine 39 in response to a first instruction. The texture memory is configured to store pixels and filter coefficients. GPU 12 may be further configured to retrieve, with texture engine 39, filter coefficients from the texture memory in response to a second instruction, and store, with the texture engine 39, pixels from the texture memory in cache 45 of texture engine 39 in response to the second instruction, and filter, with texture engine 39, the pixels using the retrieved filter coefficients.

As shown in FIG. 3, GPU 12 may receive a filter coefficient store instruction 41 that instructs GPU 12 to store one or more filter coefficients in a memory, such as graphics memory 14 and/or system memory 10. Graphics memory 14 may be configured to store texture data, pixel data, and filter coefficients. CPU 6 may generate the coefficient store shader instruction in as part of compiling code from a graphics API. For example, an OpenGL or DirectX compiler executing on CPU 6 may generate coefficient store instruction 41 in response to an OpenGL or DirectX function call. The function call may specify one or more filter coefficients to be stored, for example in a TMO, and may include an indicator (e.g., an address or a pointer) to the location at which the filter coefficients are stored (e.g., in graphics memory 14).

GPU 12 may receive filter coefficient load instruction 42 that instructs GPU 12 to retrieve filter coefficients from graphics memory 14. Filter coefficient load instruction 42 may cause GPU 12 to load filter coefficients from a location specified by an indicator in the instruction, such as a pointer or a memory address. Filter coefficient load instruction 42 may also instruct texture engine 39 or another unit of graphics pipeline 30 to multiply the filter coefficients by the texels or pixels. Filter coefficient load instruction 42 may also include an indicator (e.g., a virtual address or other indicator) of a pixel value (e.g., source pixel value) that is to be filtered. It should be noted that this disclosure will generally describe a "pixel value" to be filtered. The "pixel value" to be filtered may be one or more color components that represent the color of the pixel or texel that may be displayed. Any color format may be used to represent the color value.

In one example, a pixel value may be represented by an RGBA color format, where R represents the red value of the pixel color, G represents the green value of the pixel color, B represents the blue value of the pixel color, and A represents the alpha value (i.e., the depth value) of the pixel. In other examples, the pixel color value may be represented by a luma value (Y) and two chrominance values (e.g., U and V, or Cr and Cb). In some applications, it may desirable to filter each of the color values (e.g., each of RGBA). In other applications, it may be desirable to only filter one of the color values (e.g., only the luminance value Y in YUV or YCrCb color formats).

Once GPU 12 receives coefficient load instruction 42, a shader processor of GPU 12 may pass the address of the current pixel (e.g., source pixel) to be filtered, and an address of one or more filter coefficients associated with the filter to loop control and addressing unit 40. Loop control and addressing unit 40 may be configured to load one or more filter coefficients from graphics memory 14 into cache 45 based on the address of the filter coefficients.

Loop control and addressing unit 40 be further configured to load the source pixel and surrounding pixels into cache 45 based on an address specified in coefficient load instruction 42. Loop control and addressing unit 40 may fetch any surrounding pixel values to be filtered based the source pixel from graphics memory 14 and to store the surrounding pixels in cache 45.

Filtering unit 47 is configured to multiply a pixel within a filter kernel (i.e., the source pixel and any surrounding pixels) by a corresponding filter weight. Filtering unit 47 loads the pixels and the filter coefficients from cache 45, e.g. based on the indication in filter load instruction 42.

Texture engine 39 stores the result of the multiplication at accumulator 49. Texture engine 39 adds subsequent results of multiplying a pixel value with a corresponding filter to the result currently being stored in accumulator 49 until all pixels designated for filtering have been filtered, and each of the specified filter coefficients have been multiplied. Texture engine 39 may store the final accumulated result in accumulator 49 (e.g., in graphics memory 14) as the filtered value for the source pixel.

As described above, the techniques of this disclosure enable the utilization of a potentially unlimited number of filter coefficients. Rather than having to execute additional passes through the graphics pipeline when a large number of filter coefficients are used, loop control and addressing unit 40 iteratively loads filter coefficients from cache 45 and filtering unit 47 multiplies the loaded coefficients from cache 45 until each of the filter coefficients from the kernel have been multiplied against corresponding pixels to produce filtered texels.

Additionally, because texture engine 39 is not required to use dedicated filter registers, texture engine 39 may apply filters having asymmetrical dimensions. For example filter coefficient load instruction 42 may include a width and a height for the filter kernel. The width and the height may have different values. Loop control and addressing unit 40 may load the array of coefficients indicated by the width and height into cache 45 and cause filtering unit 47 to iteratively multiply each of the coefficients by their corresponding pixel values.

Texture engine 39 may also change a filter coefficient from a first binary representation to a second binary representation. For example, texture engine 39 may convert a filter coefficient from an integer binary representation to a floating point representation or from a floating point representation to an integer representation. Texture engine 39 may include dedicated hardware for converting the binary representation of texels, pixels, and/or filter coefficients. Converting filter coefficients from a first binary representation to a second binary representation may be useful for applications, such as convolutional filtering. Texture engine 39 or a shader unit may also change the representation of a filter coefficient from a signed representation to an unsigned representation or vice versa. Texture engine 39 may also change the representation of filter coefficients from a normalized representation to an un-normalized representation or vice versa.

Texture engine 39 or other pipeline stages may also be configured to increase or decrease the number of bits used to represent a coefficient. For example, texture engine 39 may increase the number of bits used to represent a filter coefficient from 8 bits to 16 bits, or vice versa. As another example, texture engine 39 may increase or decrease the number of bits of a filtering coefficient to match the chroma or luma components of the pixels being filtered. For instance, some video processing applications may utilize pixels with a 10-bit luma component rather than a standard 8-bit luma component. Texture engine 39 may adjust a filter coefficient to use 10-bits when filtering pixels with 10-bit luma representations.

Figure 4:
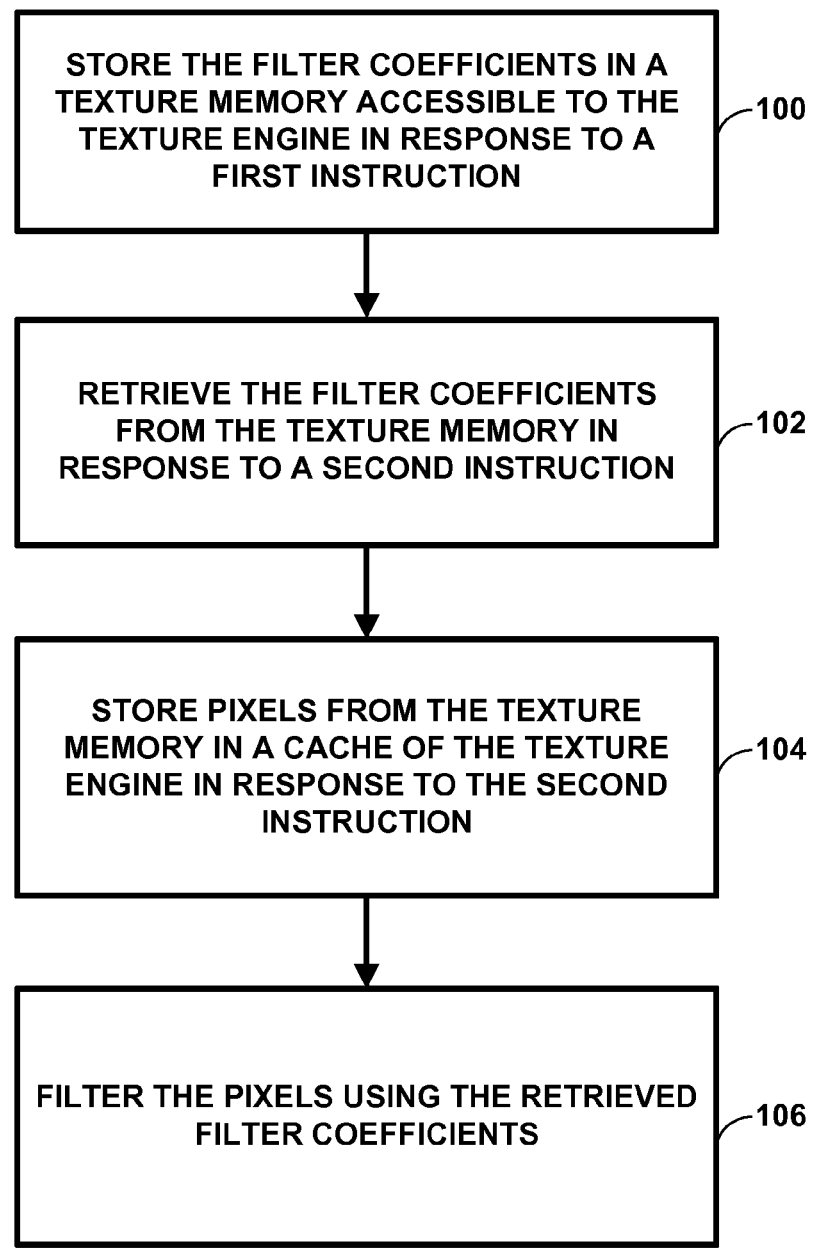
FIG. 4 is a flowchart showing an example method of the disclosure.

FIG. 4 is a flowchart showing an example method of the disclosure. The method of FIG. 4 may be carried out by one or more hardware units of GPU 12, including texture engine 39. FIG. 4 depicts a method for performing filtering in a GPU (e.g., GPU 12). In the method of FIG. 4, GPU 12 is configured to store the filter coefficients, with a texture engine such as texture engine 39, as a texture memory object (TMO) in memory accessible to texture engine 39, such as system memory 10 or graphics memory 14, in response to a first instruction (100). Graphics memory 14 may be configured to store texture data and filter coefficients.

Texture engine 39 may be further configured to retrieve the filter coefficients from the texture memory in response to a second instruction (102). Texture engine 39 may then store pixels from the texture memory in cache 45 of texture engine 39 in response to the second instruction (104), and filter the pixels using the retrieved filter coefficients (106).

In one example, to retrieve the filter coefficients, GPU 12 may be configured to store the filter coefficients in texture cache 45. To filter the pixels, GPU 12 may be further configured to load the pixels and the filter coefficients from texture cache 45, and filter, with filtering unit 47 of texture engine 39, the pixels the and the filter coefficients loaded from cache 45 to produce filtered pixels.

In another example, to filter the pixels, GPU 12 is further configured to multiply the retrieved filter coefficients with the cached pixels using an integer multiplication unit of texture engine 39. In another example, GPU 12 may be further configured to store a product of the multiplication of the retrieved filter coefficients and the cached pixels in accumulator 49 of texture engine 39.

In another example, GPU 12 may be configured to covert, with texture engine 39, a first numerical representation of the filter coefficients to a second, different numerical representation, wherein the first numerical representation and the second numerical representation comprise one of: a signed integer, an unsigned integer, a 16-bit floating point, a 32-bit floating point, an unsigned normalized (UNORM) representation, or a 64-bit floating point representation. In some examples, the filter coefficients stored in the texture memory have different vertical and horizontal dimensions. The filter may have a size greater than 4 by 4 coefficients in some examples.

In some examples, to filter the pixels, the GPU 12 may be further configured to perform trilinear filtering of the pixels in a single cycle using the retrieved filter coefficients. In yet some other example, GPU 12 may be configured to generate at least one of the first instruction and the second instruction in response to a graphics application programming interface (API) call.

In another example, the filter coefficients may comprise a first set of filter coefficients, and GPU 12 may be further configured to: store, with texture engine 39, a second set of filter coefficients in the texture memory, wherein the first set of coefficients has a first size and the second set of filter coefficients has a second size, wherein the first size is different than the second size.

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of filtering in a graphics processing unit (GPU), the method comprising:
    storing, by a texture engine of the GPU, filter coefficients of a filter as a texture memory object (TMO) in a texture cache of the GPU in response to a first instruction;
    retrieving, by the texture engine, filter coefficients from the texture cache in response to a second instruction;
    storing, by the texture engine, in the texture cache of the GPU in response to the second instruction, wherein the pixel data includes one or more pixel values; and
    filtering, by the texture engine, the pixel data stored in the texture cache using the retrieved filter coefficients.

2. The method of claim 1, wherein filtering the pixel data stored in the texture cache further comprises:
    loading the pixel data and the filter coefficients from the texture cache; and
    filtering, by a filtering unit of the texture engine, the pixel data loaded from the texture cache using the filter coefficients loaded from the texture cache to produce filtered pixel data.

3. The method of claim 1, wherein filtering the pixel data stored in the texture cache comprises multiplying the retrieved filter coefficients with the pixel data stored in the texture cache using an integer multiplication unit of the texture engine.

4. The method of claim 3, further comprising storing a product from multiplying the retrieved filter coefficients with the pixel data stored in the texture cache in an accumulator of the texture engine.

5. The method of claim 1, further comprising:
    converting, by the texture engine, a first numerical representation of the filter coefficients to a second, different numerical representation, wherein the first numerical representation and the second numerical representation comprise one of: a signed integer, an unsigned integer, a 16-bit floating point, a 32-bit floating point, an unsigned normalized (UNORM) representation, or a 64-bit floating point representation.

6. The method of claim 1, wherein the filter coefficients of the filter stored in the texture cache correspond to an array having different vertical and horizontal dimensions.

7. The method of claim 1, wherein the filter coefficients of the filter stored in the texture cache correspond to an array having a size greater than 4 by 4.

8. The method of claim 1, wherein filtering the pixel data stored in the texture cache comprises trilinear filtering the pixel data stored in the texture cache in a single cycle using the retrieved filter coefficients.

9. The method of claim 1, wherein at least one of the first instruction or the second instruction are generated in response to a graphics application programming interface (API) call.

10. The method of claim 1, wherein the filter coefficients comprise a first set of filter coefficients, the method further comprising:
storing, by the texture engine, a second set of filter coefficients in the texture cache, wherein the first set of coefficients has a first size and the second set of filter coefficients has a second size, wherein the first size is different than the second size.

11. A graphics processing unit (GPU) comprising:
a texture engine; and
a texture cache, wherein the texture engine is configured to:
store filter coefficients of a filter as a texture memory object (TMO) in the texture cache in response to a first instruction;
retrieve filter coefficients from the texture cache in response to a second instruction;
store pixel data in the texture cache in response to the second instruction, wherein the pixel data includes one or more pixel values; and
filter the pixel data stored in the texture cache using the retrieved filter coefficients.

12. The GPU of claim 11, wherein to filter the pixel data stored in the texture cache, the texture engine is further configured to:
load the pixel data and the filter coefficients from the texture cache; and
filter, with a filtering unit of the texture engine, the pixel data loaded from the texture cache using the filter coefficients loaded from the texture cache to produce filtered pixel data.

13. The GPU of claim 11, wherein to filter the pixel data stored in the texture cache, the texture engine is further configured to multiply the retrieved filter coefficients with the pixel data stored in the texture cache using an integer multiplication unit of the texture engine.

14. The GPU of claim 13, wherein the texture engine is further configured to store a product of the multiplication of the retrieved filter coefficients with the pixel data stored in the texture cache in an accumulator of the texture engine.

15. The GPU of claim 11, wherein the texture engine is further configured to:
convert, with the texture engine, a first numerical representation of the filter coefficients to a second, different numerical representation, wherein the first numerical representation and the second numerical representation comprise one of: a signed integer, an unsigned integer, a 16-bit floating point, a 32-bit floating point, an unsigned normalized (UNORM) representation, or a 64-bit floating point representation.

16. The GPU of claim 11, wherein the filter coefficients of the filter stored in the texture cache correspond to an array having different vertical and horizontal dimensions.

17. The GPU of claim 11, wherein the filter coefficients of the filter stored in the texture cache correspond to an array having a size greater than 4 by 4.

18. The GPU of claim 11, wherein to filter the pixel data stored in the texture cache, the texture engine is further configured to perform trilinear filtering of the pixel data stored in the texture cache in a single cycle using the retrieved filter coefficients.

19. The GPU of claim 11, wherein at least one of the first instruction or the second instruction are generated in response to a graphics application programming interface (API) call.

20. The GPU of claim 11, wherein the filter coefficients comprise a first set of filter coefficients, wherein the texture engine is further configured to:
store a second set of filter coefficients in the texture cache, wherein the first set of coefficients has a first size and the second set of filter coefficients has a second size, wherein the first size is different than the second size.

21. An apparatus comprising:
means for storing filter coefficients of a filter as a texture memory object (TMO) in a texture cache in response to a first instruction;
means for retrieving filter coefficients from the texture cache in response to a second instruction;
means for storing pixel data in the texture cache in response to the second instruction, wherein the pixel data includes one or more pixel values; and
means for filtering the pixel data stored in the texture cache using the retrieved filter coefficients.

22. The apparatus of claim 21, wherein the means for filtering the pixel data stored in the texture cache further comprises:
means for loading the pixel data and the filter coefficients from the texture cache; and
means for filtering the pixel data loaded from the texture cache using the filter coefficients loaded from the texture cache to produce filtered pixel data.

23. The apparatus of claim 21, wherein the means for filtering the pixel data stored in the texture cache comprises means for multiplying the retrieved filter coefficients with the pixel data stored in the texture cache.

24. The apparatus of claim 23, further comprising means for storing a product of the multiplication of the retrieved filter coefficients with the pixel data stored in the texture cache.

25. The apparatus of claim 21, further comprising:
means for converting a first numerical representation of the filter coefficients to a second, different numerical representation, wherein the first numerical representation and the second numerical representation comprise one of: a signed integer, an unsigned integer, a 16-bit floating point, a 32-bit floating point, an unsigned normalized (UNORM) representation, or a 64-bit floating point representation.

26. The apparatus of claim 21, wherein the filter coefficients of the filter stored in the texture cache correspond to an array having different vertical and horizontal dimensions.

27. The apparatus of claim 21, wherein the filter coefficients of the filter stored in the texture cache correspond to an array having a size greater than 4 by 4.

28. The apparatus of claim 21, wherein the means for filtering the pixel data stored in the texture cache comprises means for trilinear filtering the pixel data stored in the texture cache in a single cycle using the retrieved filter coefficients.

29. The apparatus of claim 21, wherein the filter coefficients comprise a first set of filter coefficients, the apparatus further comprising:
means for storing a second set of filter coefficients in the texture cache, wherein the first set of coefficients has a first size and the second set of filter coefficients has a second size, wherein the first size is different than the second size.

30. A non-transitory computer-readable medium having instructions stored thereon that, when executed, cause a texture engine of a graphics processing unit (GPU) to:
- store filter coefficients of a filter as a texture memory object (TMO) in a texture cache in response to a first instruction;
- retrieve filter coefficients from the texture cache in response to a second instruction;
- store pixel data in the texture cache in response to the second instruction, wherein the pixel data includes one or more pixel values; and
- filter the pixel data stored in the texture cache using the retrieved filter coefficients.

* * * * *